United States Patent
Kashima

(10) Patent No.: US 9,034,976 B2
(45) Date of Patent: May 19, 2015

(54) HYDROGENATED PETROLEUM RESIN PELLET PRODUCTION METHOD

(75) Inventor: Makoto Kashima, Ichihara (JP)

(73) Assignee: IDEMITSU KOSAN CO., LTD., Tokyo (JP)

(*) Notice: Subject to any disclaimer, the term of this patent is extended or adjusted under 35 U.S.C. 154(b) by 0 days.

(21) Appl. No.: 14/115,040

(22) PCT Filed: May 31, 2012

(86) PCT No.: PCT/JP2012/064025
§ 371 (c)(1),
(2), (4) Date: Oct. 31, 2013

(87) PCT Pub. No.: WO2012/165522
PCT Pub. Date: Dec. 6, 2012

(65) Prior Publication Data
US 2014/0058033 A1 Feb. 27, 2014

(30) Foreign Application Priority Data
Jun. 1, 2011 (JP) ................................. 2011-123667

(51) Int. Cl.
*C08L 65/00* (2006.01)
*C08F 212/08* (2006.01)
*C08F 8/04* (2006.01)
*C08F 232/06* (2006.01)

(52) U.S. Cl.
CPC ............... *C08L 65/00* (2013.01); *C08F 212/08* (2013.01); *C08F 8/04* (2013.01); *C08F 232/06* (2013.01)

(58) Field of Classification Search
CPC .......... C08L 65/00; C08F 112/08; C08F 8/04; C08F 232/06
USPC ......... 524/554; 525/333.3, 338; 526/283, 346
See application file for complete search history.

(56) References Cited

U.S. PATENT DOCUMENTS

| 6,458,902 B1 | 10/2002 | Okazaki et al. | |
| 2006/0063892 A1* | 3/2006 | Yamane | ...................... 525/333.3 |
| 2006/0223948 A1* | 10/2006 | Yamane | ...................... 525/333.3 |

FOREIGN PATENT DOCUMENTS

| CN | 1720272 | 1/2006 |
| CN | 1726231 | 1/2006 |
| EP | 1035143 | 9/2000 |
| JP | 02 051502 | 2/1990 |
| JP | 09 202810 | 8/1997 |
| JP | 2000 103820 | 4/2000 |
| JP | 2004 026969 | 1/2004 |
| JP | 2004026969 A * | 1/2004 |
| JP | 2004 189764 | 7/2004 |
| WO | 2004 056882 | 7/2004 |

OTHER PUBLICATIONS

International Search Report Issued Aug. 7, 2012 in PCT/JP12/064025 Filed May 31, 2012.
Office Action as received in the corresponding Chinese Patent Application No. 201280021697.X dated Mar. 23, 2015 w/English Translation.

* cited by examiner

*Primary Examiner* — Michael M Bernshteyn
(74) *Attorney, Agent, or Firm* — Oblon, McClelland, Maier & Neustadt, L.L.P.

(57) ABSTRACT

After a cyclopentadiene compound and a vinyl aromatic compound are thermally polymerized, the obtained copolymer is subjected to a hydrogenation reaction to form a hydrogenated product. After most of the hydrogenation solvent is separated by a solvent evaporation tank from the hydrogenated product, an additive separately prepared by dissolving an antioxidant is added to the hydrogenated product to form a mixture. While the hydrogenation solvent is a naphthenic solvent, the additive is prepared by dissolving the antioxidant in an aromatic additive solvent having the same carbon atoms as those of the hydrogenation solvent. Then, the low-molecular-weight component as well as the remaining hydrogenation solution and the additive solvent are separated by a thin-film evaporator from the mixture. The obtained molten resin is pelletized to produce hydrogenated petroleum resin pellets. The time for uniformly blending the antioxidant can be shortened.

10 Claims, 1 Drawing Sheet

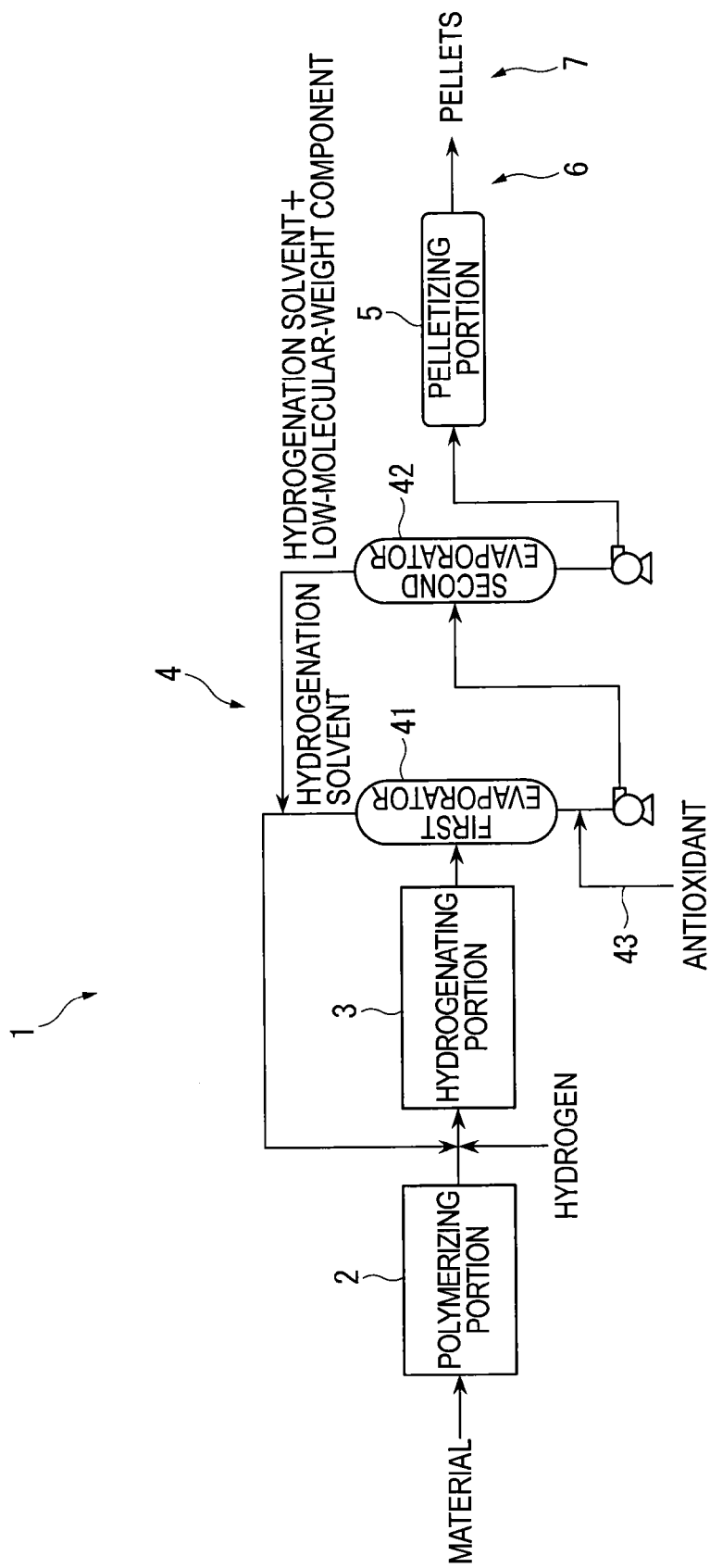

HYDROGENATED PETROLEUM RESIN PELLET PRODUCTION METHOD

This application is a National Stage of PCT/JP 12.064025 filed May 31, 2012 and claims the benefit of JP 2011-123667 filed Jun. 1, 2011.

TECHNICAL FIELD

The present invention relates to a method for producing hydrogenated petroleum resin pellets.

BACKGROUND ART

Hot-melt adhesives are widely used for manufacturing disposal diapers, binding books and packaging various products. Examples of the material of the hot-melt adhesives include Styrene-Butadiene-Styrene block copolymer (referred to as SBS hereinafter), Styrene-Isoprene-Styrene block copolymer (referred to as SIS hereinafter), Ethylene Vinyl Acetate block copolymer (referred to as EVA hereinafter) and Amorphous Poly Alpha-Olefin (referred to as APAO hereinafter). A tackifier in a form of a hydrogenated petroleum resin is blended in the base polymer.

The hydrogenated petroleum resin is produced by a hydrogenation process for hydrogenating a polymer obtained by adding styrene monomer to cyclopentadiene as disclosed in Patent Literature 1, for instance. The hydrogenated petroleum resin is sometimes provided in a form of hemispherical pellets in view of handleability.

Moreover, it is known that an antioxidant is added to the hydrogenated petroleum resin, for instance, as described in Patent Literatures 1 to 4.

CITATION LIST

Patent Literature(s)

Patent Literature 1 WO2004/056882 A
Patent Literature 2 JP-A-2004-189764
Patent Literature 3 JP-A-9-202810
Patent Literature 4 JP-A-2000-103820

SUMMARY OF THE INVENTION

Problem(s) to be Solved by the Invention

When the antioxidant to be added to the hydrogenated petroleum resin is in a form of powder, the antioxidant is added to a molten resin before pelletizing. Since it is difficult to uniformly blend the powdery antioxidant when added, a separate blending device needs to be used or it takes time to uniformly blend the antioxidant.

An object of the invention is to provide a method of producing hydrogenated petroleum resin pellets capable of easily and efficiently performing a uniform blend with an antioxidant.

Means for Solving the Problem(s)

According to an aspect of the invention, a method for producing hydrogenated petroleum resin pellets includes: thermally polymerizing a cyclopentadiene compound and a vinyl aromatic compound to obtain a copolymer; adding hydrogen to the obtained copolymer under the presence of a hydrogenation solvent to perform a hydrogenation reaction; heating a hydrogenated product obtained by the hydrogenation reaction to separate the hydrogenation solvent from the hydrogenated product to provide a molten resin, and pelletizing the molten resin, in which the method further includes: preparing a solution in which an antioxidant is dissolved; and adding the solution to the hydrogenated product after the hydrogenation reaction and before the pelletizing.

In the aspect of the invention, the solution in which the antioxidant is dissolved is preferably added at a time between: a first solvent separating step in which the hydrogenation solvent is separated after the hydrogenation reaction; and a second solvent separating step in which the hydrogenation solvent and a low-molecular-weight component are heated to be separated from the hydrogenated product from which most of the hydrogenation solvent is separated in the first solvent separating step.

In the aspect of the invention, preferably, the hydrogenation solvent is a naphthenic solvent, and the solution in which the antioxidant is dissolved is in a blend of the antioxidant and an aromatic solvent having the same carbon atoms as those of the hydrogenation solvent, as main components.

BRIEF DESCRIPTION OF DRAWING(S)

FIG. 1 is a block diagram schematically showing an arrangement of a production plant of hydrogenated petroleum resin pellets used in a production method of hydrogenated petroleum resin pellets according to an exemplary embodiment of the invention.

DESCRIPTION OF EMBODIMENT(S)

As a storage of pelletized products of the invention, an exemplary embodiment related to a storage of hydrogenated petroleum resin pellets will be described below with reference to the attached drawing.

The pelletized product in a form of hydrogenated petroleum resin pellets will be exemplified in the invention. However, the invention is also applicable to various granular substances and especially to granular substances easily damaged due to collision.

Initially, an arrangement of a production plant provided with the storage of the hydrogenated petroleum resin pellets for producing the hydrogenated petroleum resin pellets will be described below.

Arrangement of Production Plant of Hydrogenated Petroleum Resin Pellets

As shown in FIG. 1, a production plant 1 for hydrogenated petroleum resin pellets is a plant for producing hydrogenated petroleum resin pellets from a hydrogenated petroleum resin material.

The production plant 1 includes: a polymerizing portion 2; a hydrogenating portion 3; a hydrogenation solvent recovering portion 4; a pelletizing portion 5; a transferring portion 6; a storage portion 7; and a control portion (not shown).

Polymerization Reaction

The polymerizing portion 2 performs a polymerization reaction in which a cyclopentadiene compound and a vinyl aromatic compound are thermally polymerized to produce a copolymer.

The polymerizing portion 2 is provided with, for instance, a polymerization reaction tank in which the hydrogenated petroleum resin materials in a form of the cyclopentadiene compound and the vinyl aromatic compound are thermally polymerized using a solvent.

Examples of the cyclopentadiene compound include cyclopentadiene, methylcyclopentadiene, ethylcyclopentadiene, dimmer thereof and co-dimers thereof.

Examples of the vinyl aromatic compound include styrene, α-methylstyrene and vinyl toluene.

Examples of the solvent include an aromatic solvent, naphthenic solvent and aliphatic hydrocarbon solvent. Specifically, benzene, toluene, xylene, cyclohexane, methylcyclohexane, dimethylcyclohexane and ethylcyclohexane are suitably usable. The solvent is recovered as necessary from the polymerization reaction tank to be recycled.

The recovered solvent typically contains a low-molecular-weight component with a molecular weight approximately in a range from 250 to 300.

In order to avoid degradation of the physical properties, the concentration of the low-molecular-weight component is at least set at 4 mass % or less when the solvent is recycled for the thermal polymerization. According to the content of the low-molecular-weight component in the recovered solvent, the low-molecular-weight component is further separately removed or the solvent is diluted with a new solvent so that the concentration of the low-molecular-weight component falls at 4 mass % or below before being used as the polymerization solvent at the start of the polymerization reaction.

The polymerization reaction tank is a reactor for performing the polymerization in a pressurized and heated environment. The polymerization reaction tank includes a stirrer and a heater (both not shown). A first material tank, a second material tank and a solvent tank of the solvent recovering portion are connected to the polymerization reaction tank, whereby the cyclopentadiene compound, the vinyl aromatic compound and the solvent are put into the polymerization reaction tank as needed. The obtained copolymer flows out through the bottom of the polymerization reaction tank to be subjected to the subsequent hydrogenation reaction.

Herein, though the mixture ratio of the cyclopentadiene compound and the vinyl aromatic compound is not particularly limited, a typical ratio (the cyclopentadiene compound: the vinyl aromatic compound) is in a range from 70:30 to 20:80.

Further, the used amount of the polymerization solvent is in a range from 50 to 500 parts by mass relative to 100 parts by mass of a mixture of the monomers.

At the start of the thermal polymerization, it is desirable that the temperature of the solvent is heated to 100 degrees C. or more, preferably 150 degrees C. or more in the polymerization reaction tank. The mixture of the cyclopentadiene compound and the vinyl aromatic compound is added in a divided manner into the heated solvent in the polymerization reaction tank for copolymerization.

The time for adding the mixture in a divided manner is typically in a range from 0.5 to 5 hours. It is desirable that the mixture is added in equal parts. The copolymerization reaction desirably continues after the addition of the mixture of the cyclopentadiene compound and the vinyl aromatic compound is completed. Though the reaction conditions at this time are not specifically limited, the typical reaction temperature is in a range from 150 to 350 degrees C., the typical reaction pressure is in a range from 0 to 2 MPa and the typical reaction time is in a range from 1 to 10 hours.

After the thermal polymerization in the polymerization reaction tank according to the above conditions, a copolymer having a softening point in a range from 60 to 130 degrees C., a content of the vinyl aromatic compound in a range from 30 to 90 mass %, a bromine number in a range from 30 to 90 g/100 g and a number average molecular weight in a range from 400 to 1000 is obtained.

Hydrogenation Reaction

In the hydrogenating portion 3, a hydrogenation reaction for adding hydrogen to the copolymer generated by the thermal polymerization in the polymerizing portion 2 to obtain a hydrogenated product is performed.

The hydrogenating portion 3 includes a plurality of hydrogenation reactors for performing the hydrogenation reaction for adding hydrogen to the copolymer generated by the thermal polymerization in the polymerizing portion 2 under the presence of the hydrogenation solvent, and the like.

Examples of the hydrogenation solvent are cyclohexane, methylcyclohexane, dimethylcyclohexane, ethylcyclohexane and tetrahydrofuran.

A hydrogenation catalyst is fed in each of the hydrogenation reactors. The hydrogenation reactors may be used in multiple stages. A nickel catalyst, palladium catalyst, cobalt catalyst, platinum catalyst, rhodium catalyst and the like are used for the hydrogenation catalyst. Under the presence of the hydrogenation catalyst, hydrogen and the copolymer are subjected to a hydrogenation reaction at a temperature in a range from 120 to 300 degrees C. and a reaction pressure in a range from 1 to 6 MPa and for a reaction time in a range from 1 to 7 hours.

A hydrogenated product having a softening point in a range from 70 to 140 degrees C., a content of the vinyl aromatic compound in a range from 0 to 35 mass %, a bromine number in a range from 0 to 30 g/100 g and a number average molecular weight in a range from 400 to 1000 is obtained according to the above hydrogenation conditions.

In the hydrogenating portion 3, gas phase component including unreacted hydrogen is separated to be recovered after the hydrogenation by the hydrogenation reactors and is subjected to a process outside the system.

Hydrogenation Solvent Removal

The hydrogenation solvent recovering portion 4 separates and removes the hydrogenation solvent from the hydrogenated product. The hydrogenation solvent recovering portion 4 includes a solvent evaporation tank 41 (first evaporator), a thin-film evaporator 42 (second evaporator) and the like.

The solvent evaporation tank 41 is connected to the hydrogenating portion 3. The solvent evaporation tank 41 separates and recovers the hydrogenation solvent by evaporation from the hydrogenated product obtained in the hydrogenating portion 3. The evaporated hydrogenation solvent is separately recovered and is recycled as the hydrogenation solvent used during the hydrogenation reaction in the hydrogenating portion 3.

The thin-film evaporator 42 is connected to the solvent evaporation tank 41. The thin-film evaporator 42 separates and recovers the hydrogenation solvent remained in the hydrogenated product by evaporation. The evaporated hydrogenation solvent and the low-molecular-weight component are separately recovered and are recycled as a hydrogenation solvent used during the hydrogenation reaction in the hydrogenating portion 3 according to the values of the physical properties of the hydrogenated petroleum resin pellets to be produced (target hydrogenated petroleum resin).

An adding portion 43 for adding an antioxidant is provided between the solvent evaporation tank 41 and the thin-film evaporator 42 of the hydrogenation solvent recovering portion 4.

The adding portion 43 of the antioxidant adds an antioxidant to the hydrogenated product from which most of the hydrogenation solvent is removed in the solvent evaporation tank 41.

The solvent in which the antioxidant is dissolved is to be separated and recovered together with the remaining hydrogenation solvent in the evaporation process by the downstream thin-film evaporator 42. The recovered hydrogenation solvent can be recycled for the hydrogenation reaction since the solvent in which the antioxidant is dissolved does not influence the hydrogenation reaction.

The solvent in which the antioxidant is dissolved is separated and recovered together with the hydrogenation solvent from the hydrogenated product by the downstream thin-film evaporator 42.

Pelletizing

The pelletizing portion 5 pelletizes the molten resin (i.e. the hydrogenated product from which the hydrogenation solvent is removed and to which the antioxidant is added) into hemispherical hydrogenated petroleum resin pellets. The pelletizing portion 5 includes a pelletizer, a pellet-air-cooling unit (both not shown) and the like.

In the pelletizer, the molten resin is, for instance, dropped onto a cooling conveyor to produce hemispherical hydrogenated petroleum resin pellets. The produced hydrogenated petroleum resin pellets are scraped off from the surface of the cooling conveyor to be supplied to the transferring portion 6 for transferring the pellets to the storage portion 7.

Transfer

The transferring portion 6 transfers the hydrogenated petroleum resin pellets produced in the pelletizing portion 5 to the storage portion 7.

The transferring portion 6 includes a chute connected to the pelletizing portion 5, a transfer conveyor, a bucket conveyor and the like. The transferring portion 6 transfers the hydrogenated petroleum resin pellets.

It should be understood that the transferring portion 6 is not necessarily constructed as described above but various transfer devices and structures can be used for the transferring portion 6. However, since the hydrogenated petroleum resin pellets are relatively brittle, it is preferable that the transferring portion 6 is constructed so that the hydrogenated petroleum resin pellets are not damaged due to impacts during the transfer.

Storage

The storage portion 7 stores the hydrogenated petroleum resin pellets transferred by the transferring portion 6 in a manner so that the pellets are capable of being taken out.

The storage portion 7 includes storage hopper(s) (not shown) and a switching portion (not shown) for loading the hydrogenated petroleum resin pellets transferred by the bucket conveyor of the transferring portion 6 to a predetermined one of the storage hopper(s).

Control

The control portion controls the entire process of the production plant 1. The control portion includes a memory unit for storing various programs and database and an arithmetic unit for running the program to perform various calculations in order to control the entire process of the production plant 1. Specifically, the control unit controls: a temperature, a pressure and a reaction time in the polymerization reaction in the polymerizing portion 2 and the hydrogenation reaction in the hydrogenating portion 3; the recovery of the hydrogenation solvent in the hydrogenation solvent recovering portion 4; the addition of the antioxidant in the adding portion 43 of the antioxidant; the pelletization of the hydrogenated petroleum resin pellets in the pelletizing portion 5; the transferring operation and intake/discharge of air by the transferring portion 6; operation conditions of various valves, blowers and pumps; and the like.

Advantage(s) of Embodiment(s)

As described above, in the above exemplary embodiment, in the hydrogenation solvent removing step in which the hydrogenated product obtained in the hydrogenation reaction step is heated to separate the hydrogenation solvent to provide a hydrogenated product (hydrogenated petroleum resin) in a form of a molten resin (i.e., after the hydrogenation reaction step and before the pelletizing step to pelletize the hydrogenated product), an additive separately prepared in a form of a solution in which an antioxidant is dissolved is added to the hydrogenated product.

With this arrangement, time for uniformly blending the antioxidant in the hydrogenated product can be shortened and the antioxidant can be easily and uniformly blended in the hydrogenated product without using a separate blending device.

In the above exemplary embodiment, the additive containing the antioxidant is added at a time between: the first solvent separating step in which the hydrogenation solvent is separated in the solvent evaporation tank 41 after the hydrogenation reaction; and the second solvent separating step in which the remaining hydrogenation solvent and the low-molecular-weight component are heated in the thin-film evaporator 42 to be separated from the hydrogenated product from which most of the hydrogenation solvent is separated in the first solvent separating step.

With this arrangement, since the additive containing the antioxidant is added to the hydrogenated product from which most of the hydrogenation solvent is removed in the first solvent separating step, the additive can be more efficiently blended than when blended to a hydrogenated product in which most of the hydrogenation solvent remains. Further, the remaining hydrogenation solvent and the low-molecular-weight component are removed in the second solvent separating step after addition of the additive, an additive solvent that is dissolved for efficiently blending the powdery antioxidant can be easily removed, so that the softening point of the hydrogenated petroleum resin pellets can be prevented from altering due to the remaining additive solvent.

In the above exemplary embodiment, while the hydrogenation solvent is a naphthenic solvent, the additive is prepared by dissolving the antioxidant in an aromatic additive solvent having the same carbon atoms as those of the hydrogenation solvent.

Accordingly, since the additive solvent is also separated when the hydrogenation solvent is separated by the thin-film evaporator 42 in the second solvent separating step after the additive is added, the softening point is not altered due to the remaining additive solvent, so that desired hydrogenated petroleum resin pellets can be efficiently produced. Further, when the separated hydrogenation solvent is recovered and recycled for the hydrogenation reaction, the additive solvent present mixed with the hydrogenation solvent reacts with a naphthenic solvent having the same quality as that of the hydrogenation solvent in the hydrogenation reaction. Accordingly, the additive solvent can be recycled without affecting the hydrogenation reaction and can be effectively used as a hydrogenation solvent.

Modification(s)

Incidentally, it should be understood that the scope of the present invention is not limited to the above-described exemplary embodiment(s) but includes modifications and improvements as long as the modifications and improvements are compatible with the invention.

Specifically, though the hydrogenation solvent removing step after the hydrogenation reaction step and before the pelletizing step is exemplarily performed in two stages (i.e. the first and second solvent separating steps), the hydrogenation solvent and the low-molecular-weight component may be separated in a single stage or in three or more stages.

Herein, when the hydrogenation solvent is separated only in a single stage, it is preferable that the additive is added before the hydrogenation solvent is separated and the additive is also separated when the hydrogenation solvent is separated. When the hydrogenation solvent is separated in three or more stages, it is preferable that the additive is added in any timing before the separating step of the most downstream stage.

The additive solvent is not particularly limited to the aromatic solvent having the same carbon atoms as those of the naphthenic hydrogenation solvent. An additive solvent separable together with the hydrogenation solvent (e.g., a solvent having a boiling point close to that of the hydrogenation solvent) may be used.

Other specific structure and process in implementing the invention may be altered otherwise as long as the structure and the process are compatible with the invention.

The invention claimed is:

1. A method for producing a hydrogenated petroleum resin pellet, the method comprising:
   thermally polymerizing a cyclopentadiene compound and a vinyl aromatic compound to obtain a copolymer;
   adding hydrogen to the copolymer in the presence of a hydrogenation solvent to perform a hydrogenation reaction to obtain a hydrogenated product;
   preparing a solution in which an antioxidant is dissolved in an antioxidation solvent;
   heating the hydrogenated product to separate most of the hydrogenation solvent;
   adding the solution to the hydrogenated product from which most of the hydrogenation solvent is separated;
   heating the hydrogenated product to which the solution was added to separate the remaining hydrogenation solvent, a low molecular weight component and the antioxidant solvent from the hydrogenated product to provide a molten resin; and
   pelletizing the molten resin to obtain the hydrogenated petroleum resin pellet.

2. The method according to claim 1, wherein
   the hydrogenation solvent is a naphthenic solvent, and
   the solution in which the antioxidant is dissolved comprises, as a main component, an aromatic solvent comprising the same carbon atoms as those of the hydrogenation solvent.

3. The method according to claim 1, wherein the cyclopentadiene compound is cyclopentadiene, methylcyclopentadiene, ethylcyclopentadiene, a dimer thereof or co-dimers thereof.

4. The method according to claim 1, wherein the antioxidant solvent is a aliphatic hydrocarbon solvent.

5. The method according to claim 1, wherein the antioxidant solvent is benzene, toluene, xylene, cyclohexane, methylcyclohexane, dimethylcyclohexane or ethylcyclohexane.

6. The method according to claim 1, wherein the vinyl aromatic compound is styrene, α-methylstyrene, or vinyl toluene.

7. The method according to claim 1, wherein the cyclopentadiene compound and the vinyl aromatic compound are in a ratio in a range from 70:30 to 20:80.

8. The method according to claim 1, wherein the hydrogenation solvent is cyclohexane, methylcyclohexane, dimethylcyclohexane, ethylcyclohexane or tetrahydrofuran.

9. The method according to claim 1, wherein the hydrogenated product has a softening point in a range from 70 to 140 degrees C., a content of the vinyl aromatic compound in a range from 0 to 35 mass %, a bromine number in a range from 0 to 30 g/100 g and a number average molecular weight in a range from 400 to 1000.

10. The method according to claim 1, wherein the heating the hydrogenated product to separate most of the hydrogenation solvent is performed in a solvent evaporation tank and the heating the hydrogenated product to which the solution was added to separate the remaining hydrogenation solvent, the low molecular weight component and the antioxidant solvent from the hydrogenated product to provide a molten resin is performed in a thin film evaporator.

* * * * *